US010338904B2

United States Patent
Desire

(10) Patent No.: US 10,338,904 B2
(45) Date of Patent: Jul. 2, 2019

(54) SPECIALIZED APP DEVELOPMENT AND DEPLOYMENT SYSTEM AND METHOD

(71) Applicant: SCHNEIDER ELECTRIC BUILDINGS, LLC, Palatine, IL (US)

(72) Inventor: Joel Desire, Cambridge, MA (US)

(73) Assignee: SCHNEIDER ELECTRIC BUILDINGS, LLC, Palatine, IL (US)

( * ) Notice: Subject to any disclaimer, the term of this patent is extended or adjusted under 35 U.S.C. 154(b) by 192 days.

(21) Appl. No.: 14/467,665

(22) Filed: Aug. 25, 2014

(65) Prior Publication Data
US 2016/0054988 A1 Feb. 25, 2016

(51) Int. Cl.
G06F 9/44 (2018.01)
G06F 8/60 (2018.01)
H04W 8/24 (2009.01)
G06F 8/61 (2018.01)
G05B 19/04 (2006.01)
(Continued)

(52) U.S. Cl.
CPC .............. *G06F 8/60* (2013.01); *G05B 19/04* (2013.01); *G05B 19/05* (2013.01); *G06F 8/38* (2013.01); *G06F 8/61* (2013.01); *G06F 9/4451* (2013.01); *G06F 9/44526* (2013.01); *G06F 9/451* (2018.02); *H04L 29/08099* (2013.01); *H04L 67/30* (2013.01); *H04W 8/245* (2013.01)

(58) Field of Classification Search
CPC ........................................................ G06F 8/60
See application file for complete search history.

(56) References Cited

U.S. PATENT DOCUMENTS 8,200,790 B1* 6/2012 Reeves ..................... G06F 8/60
709/220
2002/0062405 A1* 5/2002 Ayyagari .................. G06F 8/61
719/331
(Continued)

FOREIGN PATENT DOCUMENTS

CN 101527634 A 9/2009

OTHER PUBLICATIONS

Didier Donsez Ed—Alireza Seyedi et al: "On-Demand Component Deployment in the UPnP Device Architecture", Consumer Communications and Networking Conference, 2007. CCNC 2007. 20 07 4th IEEE, IEEE, PI, Jan. 1, 2007 (Jan. 1, 2007), pp. 920-924, XP031087917, ISBN: 978-1-4244-0667-8.
(Continued)

*Primary Examiner* — Chat C Do
*Assistant Examiner* — Lenin Paulino
(74) *Attorney, Agent, or Firm* — Lando & Anastasi, LLP

(57) ABSTRACT

According to at least one embodiment, a computer system for binding widgets to devices is provided. The computer system includes one or more memory elements collectively storing a plurality of widgets including a plurality of default identifiers and a plurality of identifiers of a plurality of devices associated with an identified space. The computer system also includes at least one processor in data communication with the one or more memory elements and a deployment component executable by the at least one processor. The deployment component is configured to receive a request to bind the plurality of widgets to the plurality of devices and bind, in response to receiving the request, the plurality of widgets to the plurality of devices using the plurality of identifiers.

18 Claims, 8 Drawing Sheets

(51) Int. Cl.
  *G05B 19/05* (2006.01)
  *G06F 8/38* (2018.01)
  *G06F 9/445* (2018.01)
  *H04L 29/08* (2006.01)
  *G06F 9/451* (2018.01)

(56) References Cited

U.S. PATENT DOCUMENTS

| | | | | |
|---|---|---|---|---|
| 2010/0023865 | A1* | 1/2010 | Fulker | G06F 3/04817 |
| | | | | 715/734 |
| 2010/0280635 | A1* | 11/2010 | Cohn | G08B 29/02 |
| | | | | 700/90 |
| 2012/0030672 | A1* | 2/2012 | Zygmuntowicz | G06F 8/60 |
| | | | | 718/1 |
| 2012/0108230 | A1* | 5/2012 | Stepanian | G06F 21/10 |
| | | | | 455/422.1 |
| 2014/0280508 | A1* | 9/2014 | Tsai | H04L 67/303 |
| | | | | 709/203 |
| 2014/0324410 | A1* | 10/2014 | Mathews | G09B 25/00 |
| | | | | 703/22 |
| 2015/0082239 | A1* | 3/2015 | Zhao | H04L 67/2823 |
| | | | | 715/788 |
| 2015/0097961 | A1* | 4/2015 | Ure | G08B 5/223 |
| | | | | 348/159 |
| 2015/0222691 | A1* | 8/2015 | Zhang | G06F 3/04842 |
| | | | | 715/740 |

OTHER PUBLICATIONS

Extended European Search Report from corresponding European Application No. 15181191.6 dated Feb. 4, 2016.

Gabriele De Luca et al: "The use of NFC and Android technologies to enable a KNX-based smart home", 21st International Conference on Software, Telecommunications and Computer Networks, (SOFTCOM 2013), Sep. 1, 2013 (Sep. 1, 2013), pp. 1-7, XP055242918, DOI: 10.1109/SoftCOM.2013.6671904;ISBN: 978-953-29-0040-8.

Gona PRG ALO Candido et al: "Service-Oriented Infrastructure to Support the Deployment of Evolvable Production Systems", IEEE Transactions on Industrial Informatics, IEEE Service Center, New York, NY, US, vol. 7, No. 4, Nov. 1, 2011 (Nov. 1, 2011), pp. 759-767, XP011362443, ISSN: 1551-3203, DOI: 10.1109/T11.2011. 2166779.

Han Son N et al: "Semantic Context-Aware Service Composition for Building Automation System", IEEE Transactions on Industrial Informatics, IEEE Service Center, New York, NY, US, vol. 10, No. 1, Feb. 1, 2014 (Feb. 1, 2014), pp. 752-761, XP011533988, ISSN: 1551-3203, DOI: 10.1109/TII.2013.2252356 [retrieved on Dec. 12, 2013].

Kistler R et al: "An adaptive network architecture for home and building environments", Emerging Technologies and Factory Automation, 2008. ETFA 2008. IEEE International Conference on, IEEE, Piscataway, NJ, USA, Sep. 15, 2008 (Sep. 15, 2008), pp. 295-302, XP031344627, ISBN: 978-1-4244-1505-2.

* cited by examiner

SPECIALIZED APP DEVELOPMENT AND DEPLOYMENT SYSTEM AND METHOD

BACKGROUND

Technical Field

The technical field of this disclosure relates generally to software application development and deployment frameworks and, more specifically, to frameworks for developing and deploying software applications for mobile computing devices.

Discussion

Enclosed spaces typically include a wide variety of equipment with which to interact. For example, a Hotel Room may include a wall mounted thermostat to control room temperature and fan speed, various switches to control lighting, a remote control for an entertainment system (TV, Pay per View movies, etc.), and a telephone through which an occupant may call special phone numbers to order services (wakes up, make my room, do not disturb, laundry, taxi . . . ). In another example, a hospital room may have the equipment listed above and additionally bed controls, nurse call button controls, medical equipment controls, and the like.

Software applications that monitor and control of some of this equipment have emerged. These equipment control applications often offer robust functionality for the limited subset of the equipment upon which they focus. As a result of this limited focus, conventional equipment control applications are independent from one another both in terms of the equipment controlled and the composition of their user interfaces.

SUMMARY

According to at least one embodiment, a computer system for binding widgets to devices is provided. The computer system includes one or more memory elements collectively storing a plurality of widgets including a plurality of default identifiers and a plurality of identifiers of a plurality of devices associated with an identified space. The computer system also includes at least one processor in data communication with the one or more memory elements and a deployment component executable by the at least one processor. The deployment component is configured to receive a request to bind the plurality of widgets to the plurality of devices and bind, in response to receiving the request, the plurality of widgets to the plurality of devices using the plurality of identifiers.

In the computer system, the request to bind may be included in a request to deploy and the deployment component may be further configured to transmit, in response to receiving the request to deploy, a user app to a mobile computing device, the user app including the plurality of widgets and being configured to monitor and control the plurality of devices via the plurality of widgets. The deployment component may be configured to transmit the user app to a shell app executing on the mobile computing device, the shell app being configured to automatically install the user app on the mobile device in response to receiving the user app.

The computer system may further include a monitor and control system associated with the identified space and configured to monitor and control the plurality of devices. Further, at least one widget of the plurality of widgets may include a system interface configured to transmit at least one request to at least one device of the plurality of devices via the monitor and control system. The monitor and control system may be a building management system. The deployment component may be configured to bind the plurality of widgets to the plurality of devices by replacing the plurality of default identifiers with identifiers from the plurality of identifiers and the at least one request includes at least one identifier of the plurality of identifiers.

In the computer system, the request to bind may be included in a request to store and the deployment component may be further configured to store, in response to receiving the request to store, a user app at a location accessible by an app management system. The app management system may be configured to simulate the user app on an external computer system.

In the computer system, the deployment component may be further configured to receive a request to deploy distinct from the request to bind and transmit, in response to receiving the request to deploy, the user app to a mobile computing device. The deployment component may also be configured to bind the plurality of widgets to the plurality of devices at least in part by binding at least one widget of the plurality of widgets to at least one control point of at least one device of the plurality of devices.

In another embodiment, a method of binding widgets to devices using a computer system is provided. The computer system includes one or more memory elements collectively storing a plurality of widgets including a plurality of default identifiers and a plurality of identifiers of a plurality of devices associated with an identified space. The method includes acts of receiving, by a deployment component executed by at least one processor in data communication with the one or more memory elements, a request to bind the plurality of widgets to the plurality of devices and binding, by the deployment component in response to receiving the request, the plurality of widgets to the plurality of devices using the plurality of identifiers.

In the method, the request to bind may be included in a request to deploy and the method may further include an act of transmitting, by the deployment component, in response to receiving the request to deploy, a user app to a mobile computing device, the user app including the plurality of widgets and being configured to monitor and control the plurality of devices via the plurality of widgets. The act of transmitting the user app may include an act of transmitting the user app to a shell app executing on the mobile computing device, and the method further include an act of automatically installing, by the shell app, the user app on the mobile device in response to receiving the user app.

The method may further comprise an act of transmitting, by a system interface included in at least one widget of the plurality of widgets, at least one request to at least one device of the plurality of devices via a monitoring and control system associated with the identified space and configured to monitor and control the plurality of devices. The act of transmitting the at least one request may include an act of transmitting the at least one request via a building management system.

In the method, the act of binding the plurality of widgets may include an act of replacing the plurality of default identifiers with identifiers from the plurality of identifiers and transmitting the at least one request may include an act of transmitting at least one request including at least one identifier of the plurality of identifiers. In the method, the request to bind may be included in a request to store and the method may further include an act of storing, in response to receiving the request to store, a user app at a location accessible to an app management system.

The method may further include an act of simulating, by the app management system, the user app on an external computer system. The method may further include an act of receiving, by the deployment component, a request to deploy distinct from the request to bind and transmitting, in response to receiving the request to deploy, the user app to a mobile computing device.

In another embodiment, a non-transitory computer readable medium storing sequences of computer executable instructions for binding widgets to devices is provided. The sequences of computer executable instructions include instructions that instruct at least one processor to execute a deployment component; receive, by the deployment component, a request to bind a plurality of widgets to a plurality of devices associated with an identified space; access, by the deployment component, one or more memory elements in data communication with the at least one processor and collectively storing a plurality of widgets including a plurality of default identifiers and a plurality of identifiers of the plurality of devices; and bind, in response to receiving the request, the plurality of widgets to the plurality of devices using the plurality of identifiers.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
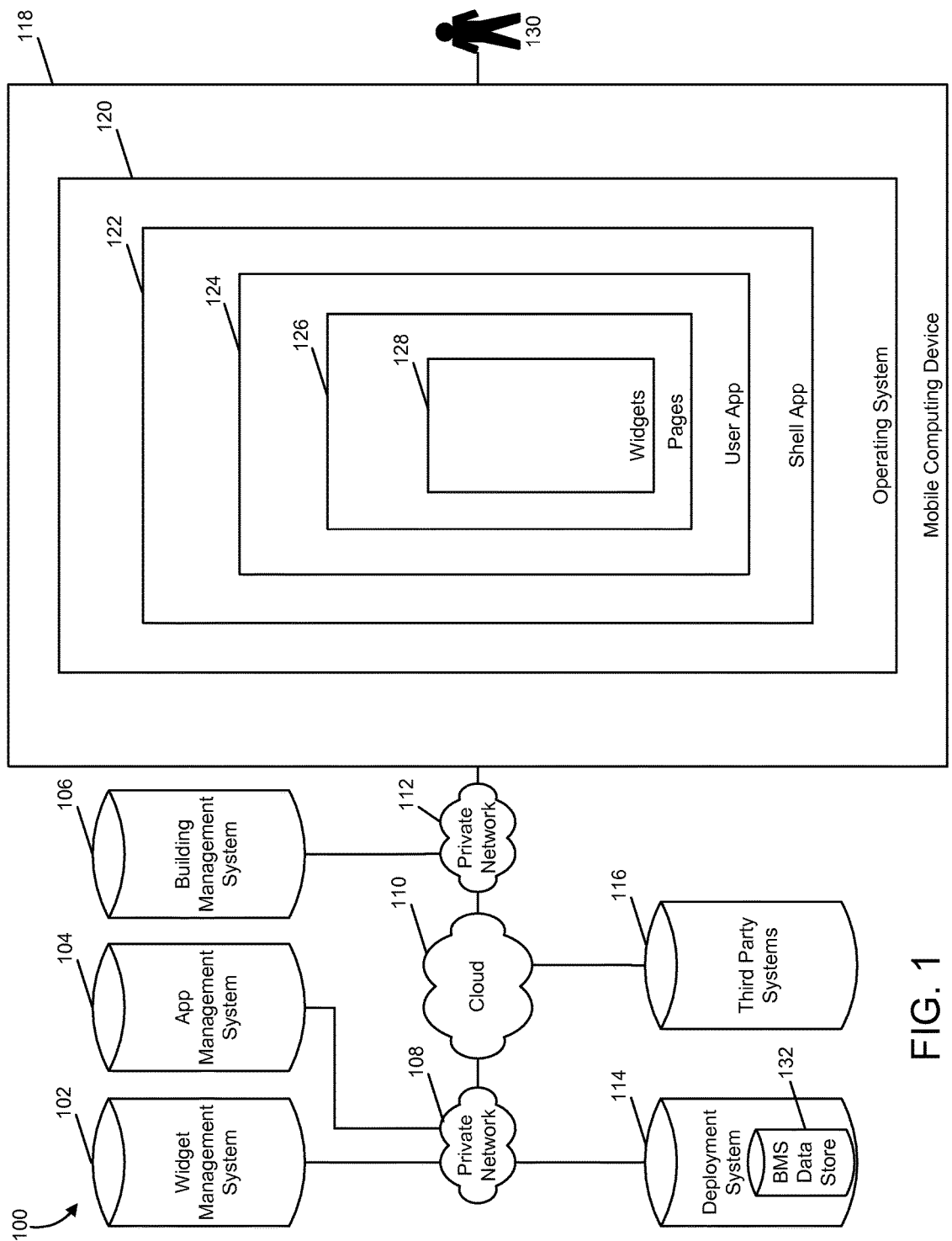
FIG. 1 is a block diagram of an app development and deployment system.

Some embodiments disclosed herein include apparatus and processes that implement app development and deployment system that is configured to provide a unified user interface for monitoring and controlling devices associated with an identified space. An identified space may be any physical volume, such as a room, building, campus, patio, field, etc. . . . . . The unified user interface eliminates the disjointed user experience associated with conventional, independent monitoring and control systems by providing a coherent user interface that supports most or all of the devices associated with the identified space. In some embodiments, the app development and deployment system includes a platform that supports the development of a set of standardized widgets (user interface elements and accompanying executable processes). For example, the set of standardized widgets may be developed by employees of providers of building management systems. The set of standardized widgets can be quickly and easily configured to create a unified user interface specific to an identified space and user role. In these embodiments, app development and deployment system also includes a deployment component that pushes (automatically transmits) widgets and associated configuration information to one or more mobile computing devices hosting the app. In this way, the embodiments disclosed herein provide for a mass customization of apps in a manner that increases relevance and usability of the apps.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

App Development and Deployment System

Some embodiments disclosed herein implement an app development and deployment system using one or more computer systems, such as the computer systems described below with reference to FIG. 2. According to these embodiments, the app development and deployment system executes a variety of processes that support mass customization of apps for particular user roles and identified spaces. FIG. 1 illustrates an example app development and deployment system 100. As shown, the app development and deployment system 100 includes a widget management computer system 102, an app management computer system 104, a building management computer system 106, a deployment management computer system 114, third party computer systems 116, a mobile computing device 118, private communications networks 108 and 112, and a public communications network 112. A user 130 interacts (e.g., provides input and receives output) with the mobile computing device 118. The mobile computing device 118 includes an operating system 120, a shell app 122, a user app 124, one or more pages 126, and one or more widgets 128. The deployment management system 114 includes a BMS data store 132.

In some embodiments, a widget, such as one of the widgets 128, is a software component that monitors and controls at least one control point of a device or service. A control point may include any parameter of a device or service that when adjusted alters the operation of the device or service. A widget may implement one or more system interfaces to exchange information with a building management system, patient management system, real-time locating system, third party system or other geo-centric monitoring and control system and one or more user interfaces to interact with a user. The system interfaces of a widget may support one or more protocols, such as Web Services or EWS. In some embodiments, the widgets 128 are fundamental building blocks for pages, such as the pages 126. In these embodiments, each widget presents a consistent user interface within the context of each page comprising the widget. A widget may be bound to a device within an identified space or a service available to occupants of the identified space. In some embodiments, a widget that is bound to a device will exchange information with the computer system that that monitors and controls the device (e.g., a building management system), or the device itself, via its system interface. In other embodiments, a widget is bound to another widget to exchange information with the other widget. A widget may be bound to another widget within the same user app. A widget within a first user app may be bound to another widget within a second, distinct user app. In some embodiments, the first user app and the second user app may be hosted on the same mobile computing device. In other embodiments, the first user app is hosted by a first mobile computing device and the second user app is hosted by a second, distinct mobile device. This information may support monitoring and control of the device. The widgets 128 may bind to, and thus monitor and control, any device supported by a monitoring and control system, such as a building management system. In some embodiments, widgets may be associated with (and only made available to) users having a specific role.

In other embodiments, widgets support "skinning" Widgets that support skinning may be used to provide customers with user apps that have a customized and unique look and feel for the customer's identified space (e.g., facility or campus). Widgets that support skinning adapt their display and behavioral characteristics to a selected design theme specified by one or more configurable parameters. These display and behavioral characteristics may include font, color palette, highlighting behavior, shading, element arrangement and alignment on a page, and other design considerations. In one particular example, widgets that support skinning may display all temperature information using a particular color and may highlight values that exceed threshold values by displaying the values as blinking elements. Many other design considerations may be implemented using widgets that support skinning. For example, widgets that support skinning may be configured to present identified users (e.g., aged users) with bigger characters and fewer features. Alternatively, widgets that support skinning may be configured to present a loyal customer with access to additional services (e.g., late check out).

In some embodiments, a page, such as one of the pages 126 is a software component that groups and manages widgets, such as the widgets 128. A page exchanges information with the widgets they comprise and re-organize widget presentation where one or more of the widgets in the group is hidden (e.g. due to lack of association with the current user's role or lack of authorization of the current user). In some embodiments, pages support basic navigation within a user app by receiving and implementing navigation requests issued by widgets.

In some embodiments, a user app, such as the user app 124, is a collection of pages configured to provide monitoring and control functionality of devices and services associated with an identified space to users functioning in indentified roles. The user app 124 may implement a unified user interface using a variety of technologies and may include sundry elements (e.g., screens, windows, buttons, boxes, etc) arranged according to various user interface metaphors.

In some embodiments, a shell app, such as the shell app 122, is a software component that manages deployment of apps to the mobile computing device executing the shell app. In at least one embodiment, the shell app provides no functionality aside from supporting the deployment process. Shell apps may be available at and deployed from, for example, app stores such as Apple Store, Google Play, Windows Store, etc.

As illustrated in FIG. 1, the widget management system 102, the app management system 104, and the deployment system 114 exchange (i.e. transmit or receive) information via the private network 108. This information may support widget and app development activity as described further below. The building management system 106 and the mobile computing device 118 exchange information via the private network 112. This information may support monitoring and control of devices as described further below. The deployment system 114 and the mobile computing device 118 exchange information via the public network 110 and the private networks 108 and 112 (e.g. via a VPN or other secure connection). This information may support deployment of apps as described further below.

As shown in FIG. 1, the app management system 104 and the third party systems 116 (e.g., workstations of app developers) exchange information via the public network 110 and the private network 108 (e.g. via a VPN or other secure connection). This information may support development of apps as described further below. The mobile computing device 118 and the third party systems 116 exchange information via the private network 112 and the public network 110. This information may support monitoring and control of external devices and services. The building management system 106 and the deployment system 114 exchange information via the public network 110 and the private networks 108 and 112 (e.g. via a VPN or other secure connection). This information may be stored locally in the building management system (BMS) data store 132 and may support configuration, testing, and deployment of apps as described further below.

The networks 108, 110, and 112 may include any communication network through which computer systems exchange information. For example, the public network 110 may be any public network, such as the Internet, and may include other public or private networks such as LANs, WANs, extranets, intranets, and cloud computing systems. The network 112 may also include cellular networks such as LTE, 4G, HSDPA/HSUPA, TD-SCDMA, W-CDMA, CMDA, WiFi, Bluetooth, EvDO, GSM, and iDEN networks.

In the embodiment shown in FIG. 1, the private networks 108 and 112 provide increased security relative to the public network 110. For example, the private networks 108 and 112 may include firewalls, encryption devices, and other security equipment. The private networks 108 and 112 may also include standard networking equipment required to implement LANs, WANs, building automation and control networks, other industrial controls networks, and SCADA networks. Examples of protocols supported by the private networks include MODBUS, UMAS, TCP/IP over Ethernet, BACnet, LON, C-BUS, DMX512, JCI-N2, KNX, enocean, and ZigBee.

Embodiments of the app development and deployment system 100 illustrated by FIG. 1 include three distinct networks. However, embodiments may include any number of communication networks and are not limited to a particular network type, number, or configuration.

According to one embodiment illustrated by FIG. 1, the widget management system 102 is configured to provide a platform for the development of widgets, such as the widgets 128. Employees of a provider of building management systems, such as the building management system 106, may utilize this platform to develop a set of standardized widgets. In some embodiments, at least some of the widgets 128 correspond to a device (or a control point within a device) that is monitored and controlled by the building management system 106. These widgets may be bound to one device, a plurality of devices, or one or more control points within one or more devices that are monitored and controlled by the building management system 106 to enable the widgets to monitor and control the devices or control points.

In some embodiments, the app management system 104 is configured to provide a platform for the development of user apps, such as the user app 124. Employees of a systems integrator who install building management systems and integrate these systems with other systems may utilize this platform to develop user apps using the set of standardized, pre-engineered widgets. The platform provided by the app management system 104 may enable developers to both create apps and simulate then on their development workstations.

In at least one embodiment, the platform provided by the app management system 104 enables third party systems, such as the third party systems 116, to develop user apps. In this embodiment, the platform receives user input from the third party systems and sends output to the third party systems. This input may specify the composition of a user app by indicating the identity and location of a plurality of widgets within a plurality of pages that constitute the user app. In other embodiments, the platform may also exchange input and output with computer systems in data communication with the app management system 104 solely via the private network 108 (e.g., where developers are using the app management system 104 via computer systems in data communication with the app management system solely via the private network 108). In at least one embodiment, the platform provided by the app management system 104 includes a test environment which may access bound user apps stored on the deployment system 114, or in another location accessible by the app management system 104.

In some embodiments, the deployment system 114 is configured to provide a platform for the deployment of user apps to the mobile computing device 118. When executing according to this configuration, the deployment system 114 transmits a notification to the shell app 122 indicating that the user app 124 is available for deployment. In response to receiving the notification from the deployment system 114, the shell app 122 transmits a request for the user app 124 to the deployment server 114.

In response to receiving the request for the user app 124 from the shell app 122 (or the app management system 104), the deployment system 114 binds widgets included in the user app 124 to devices associated with an identified space using device information and user preference information stored in the BMS data store 132. Next, the deployment system 124 transmits the user app 124 to the shell app 122, or simply stores the bound user app at a location accessible by the app management system 104. The transmission of the user app 124 to the shell app 122 may be synchronous (e.g., occurring immediately after the request for deployment of the user app if the mobile device is in data communication with the deployment system) or asynchronous (e.g., occurring the next time the mobile computing device 118 is in data communication with the deployment system 114).

In response to receiving the user app 124, the shell app 122 installs the user app 124. The user app 124 is transmitted to the shell app 122 preconfigured for the identified space in which the mobile computing device 118 operates (e.g., the user app 124 includes widgets that are bound to the devices associated with the identified space). Once the shell app 122 has received and installed the user app 124, the user app 124 is available for execution and interaction with users of the mobile computing device 118. Additional examples of processes and actions that the deployment server 114 is configured to execute are described further below with reference to FIG. 3.

In some embodiments, the mobile computing device 118 is configured to provide users with a unified user interface that provides monitoring and control for devices associated with an identified space. When executing according to this configuration, the mobile device executes the operating system 120. The operating system 120 may be any commercially available operating system, such as iOS, Android, Windows, Mac OS, Linux, etc. The operating system 120, in turn, executes the shell app 122 and the user app 124. In some embodiments, the user app 124 is configured to request authentication credentials for a user associated with a user role. In response to receiving authentication credentials, the user app 124 verifies the received authentication credentials (e.g., via an authentication server (not shown) in data communication with the private network 108, the cloud 110, or the private network 112) and displays the pages 126 via display hardware (e.g., a touch screen). The user app 124 may present one or more particular pages that are associated with the user role. The pages 126 include the widgets 128. Because the widgets 128 are bound to the devices associated with the identified space, the widgets 128 retrieve monitoring and control information from the building management system 106 via their system interfaces.

Each of the widgets 128 may also receive input via its user interface. This input may include one or more commands. Some of these commands may specify an operation to be performed by the device bound to the widget. Where the device is controlled by the building management system 106, the widget transmits a request to the building management system 106 via its system interface in response to receiving a command specifying an operation to be performed by the device. The request may include information descriptive of the operation to be performed by the device. In response to receiving this information, the building management system 106 instructs the device to execute the operation and transmits a message to the widget. The message may include information resulting from the operation (e.g., an acknowledgement or query result). The widget receives the message and provides output via its user interface that indicates the content of the message.

Where the device is controlled by one or more of the third party systems 116, the widget transmits a request to the third party systems 116 via its system interface in response to receiving a command specifying an operation to be performed by the device. The request may include information descriptive of the operation to be performed by the device. In response to receiving this information, the third party systems 116 instructs the device to execute the operation and transmits an acknowledgment to the widget. The widget receives the acknowledgment and provides output via its user interface that indicates the operation was performed by the device.

Where the device is self-controlled, the widget transmits a request to the device via its system interface in response to receiving a command specifying an operation to be performed by the device. The request may include information descriptive of the operation to be performed by the device. In response to receiving this information, the device executes the operation and transmits an acknowledgment to the widget. The widget receives the acknowledgment and provides output via its user interface that indicates the operation was performed by the device.

Other commands that may be included in input received by a widget via its user interfaces include requests for services supported by one or more of the third party systems 116. In one embodiment, where the command is directed to a third party system, the widget transmits a request to the third party system via its system interface in response to receiving a command specifying an operation to be performed by the third party system. The request may include information descriptive of the operation to be performed by the third party system. In response to receiving this information, the third party system executes the operation and transmits an acknowledgment to the widget. The widget receives the acknowledgment and provides output via its user interface that indicates the operation was performed by the device.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Within the app development and deployment system 100, data may be stored in any logical construction capable of storing information on a computer readable medium including, among other structures, flat files, indexed files, search engine indexes, hierarchical databases, relational databases or object oriented databases. These data structures may be specifically configured to conserve storage space or increase data exchange performance. In addition, various examples organize the data into particularized and, in some cases, unique structures to perform the functions disclosed herein. In these examples, the data structures are sized and arranged to store values for particular types of data, such as integers, floating point numbers, character strings, arrays, linked lists, and the like. In addition, while FIG. 1 illustrates a single mobile computing device 118, other embodiments include a plurality of mobile computing devices such as the mobile computing device 118. Thus embodiments are not limited to any particular number of mobile computing devices.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, laptop computers, and personal digital assistants) and network equipment (e.g., load balancers, routers, and switches). Examples of particular models of mobile computing devices include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 2:
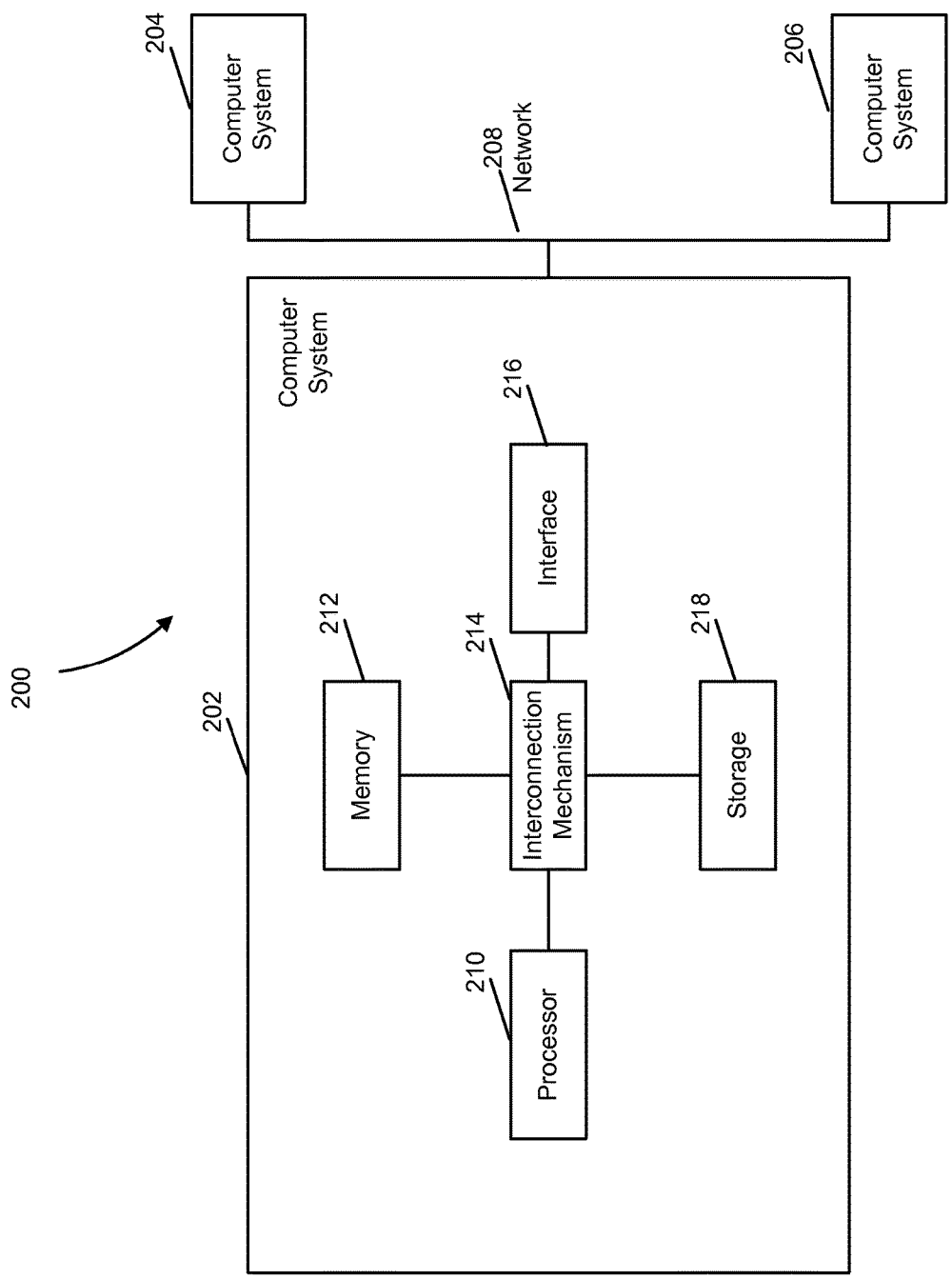
FIG. 2 is a schematic diagram of a computer system.

Referring to FIG. 2, there is illustrated a block diagram of a distributed computer system 200, in which various aspects and functions are practiced. As shown, the distributed computer system 200 includes one or more computer systems that exchange information. More specifically, the distributed computer system 200 includes computer systems 202, 204, and 206. As shown, the computer systems 202, 204, and 206 are interconnected by, and may exchange data through, a communication network 208. The network 208 may include any communication network through which computer systems may exchange data. To exchange data using the network 208, the computer systems 202, 204, and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 202, 204, and 206 may transmit data via the network 208 using a variety of security measures including, for example, SSL or VPN technologies. While the distributed computer system 200 illustrates three networked computer systems, the distributed computer system 200 is not so limited and may include any number of computer systems and computing devices, networked using any medium and communication protocol.

As illustrated in FIG. 2, the computer system 202 includes a processor 210, a memory 212, an interconnection element 214, an interface 216 and data storage element 218. To implement at least some of the aspects, functions, and processes disclosed herein, the processor 210 performs a series of instructions that result in manipulated data. The processor 210 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 210 is connected to other system components, including one or more memory devices 212, by the interconnection element 214.

The memory 212 stores programs (e.g., sequences of instructions coded to be executable by the processor 210) and data during operation of the computer system 202. Thus, the memory 212 may be a relatively high performance, volatile, random access memory such as a dynamic random access memory ("DRAM") or static memory ("SRAM"). However, the memory 212 may include any device for storing data, such as a disk drive or other nonvolatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the interconnection element 214. The interconnection element 214 may include any communication coupling between system components such as one or more physical busses in conformance with specialized or standard computing bus technologies such as IDE, SCSI, PCI and InfiniBand. The interconnection element 214 enables communications, including instructions and data, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and to communicate with external entities, such as users and other systems.

The data storage element 218 includes a computer readable and writeable nonvolatile, or non-transitory, data storage medium in which instructions are stored that define a program or other object that is executed by the processor 210. The data storage element 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage element 218. The memory may be located in the data storage element 218 or in the memory 212, however, the processor 210 manipulates the data within the memory, and then copies the data to the storage medium associated with the data storage element 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources.

Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

App Development and Deployment Processes

Figure 3:
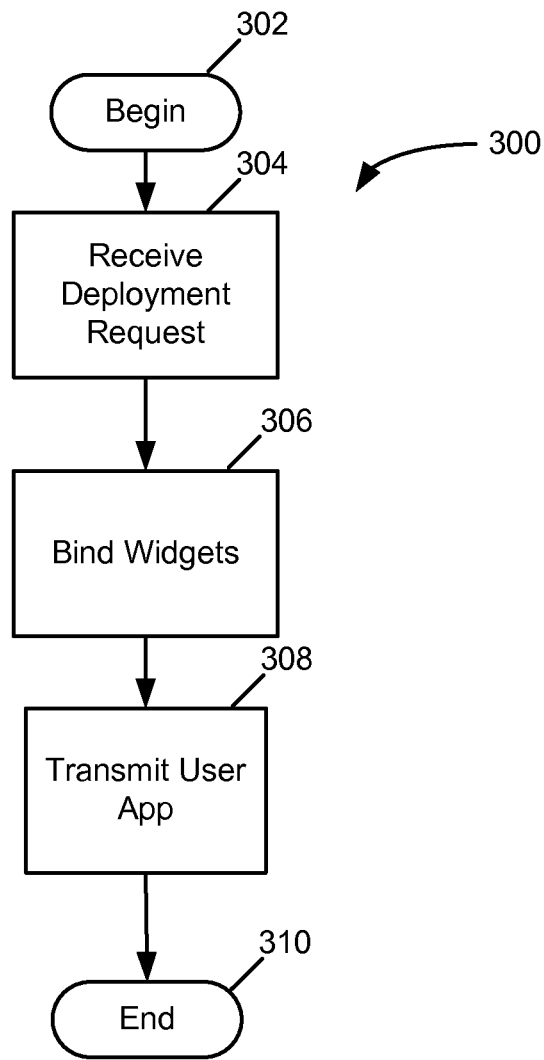
FIG. 3 is a flow diagram of a deployment process executed by an app development and deployment system.

As described above with reference to FIG. 1, some embodiments execute various development and deployment processes. FIG. 3 illustrates an example deployment process executed by a deployment component, such as the deployment system 114 describe above with reference to FIG. 1. As illustrated in FIG. 3, the deployment process 300 includes acts of receiving a deployment request, binding widgets, and transmitting a user app. The deployment process 300 begins at 302.

In act 304, a deployment request is received. In at least one embodiment, the deployment request is received by the deployment component. The deployment request may include information identifying the source of the deployment request (e.g., a shell app hosted by a mobile device, such as the shell app 122 executing on the mobile device 118 described above with reference to FIG. 1). The deployment request may also include information identifying a user app requested for deployment (e.g., the user app 124 described above with reference to FIG. 1).

In act 306, widgets are bound. In at least one embodiment, the widgets 128 are bound by the deployment component using information stored in the BMS data store 132. In this embodiment, the BMS data store 132 includes configuration information about devices and user preferences. This configuration information may be descriptive of devices managed by a building management system, such as the building management system 106. In some embodiments, the configuration information is retrieved from the building management system and stored in the BMS data store during execution of the act 306. In other embodiments, the configuration information is retrieved from the building management system and stored in the BMS data store prior to execution of the deployment process 300.

In at least one embodiment, the deployment component binds the widgets 128 to devices monitored and controlled by the building management system 106 by replacing a default device identifier stored in the widget with a specific device identifier. For example, a default device identifier may be string value (e.g., "$AS$/RoomController/SetPoint", "$EntertainmentSystem$/Channel"). During the act of binding, the deployment component may replace $AS$ with an IP address and authentication credentials (e.g., "192.168.1.17/EWS/ . . . ", "Username, Password"). As implied from the syntax in this example, in some embodiments, a widget may be bound to a control point within device rather than the device itself. In these embodiments, there may be widgets on a page to monitor and control a single device that is monitored and controlled by the building management system.

In act 308, a user app is transmitted. In at least one embodiment, the user app is transmitted by the deployment component to the source of the deployment request via the private and public networks (e.g., private networks 108 and 112 and the private network 110 described above with reference to FIG. 1). In response to receiving the user app, the shell app installs the user app, which is ready for use by a user due to its preconfigured settings and bindings.

The deployment process 300 ends at 310. The deployment process 300 may be repeatedly executed as needed to configure a fleet of mobile computing devices. Processes in accord with the deployment process 300 enable app development and deployment systems to deploy apps that are ready to use with little or no additional configuration required. Further, it is appreciated that binding processes, such as the binding process 300, enable mass customization of a fleet of mobile computing devices. This mass customization is achieved by configuring each user app on each mobile computing device with the information necessary for the user app to monitor and control all devices and service associated with an identified space (e.g., a specific hotel room).

Figure 4:
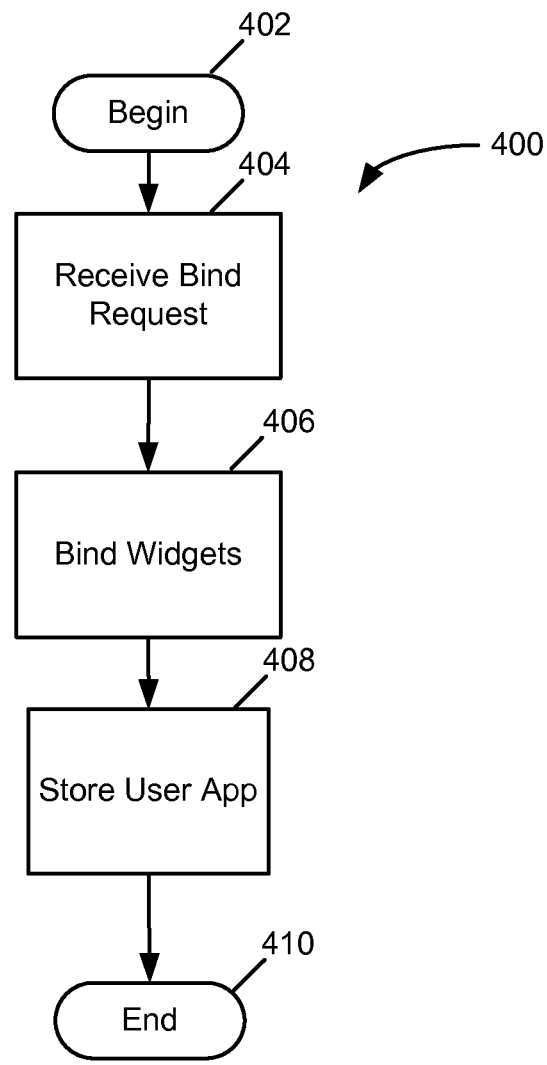
FIG. 4 is a flow diagram of a binding process executed by an app development and deployment system.

As described above with reference to FIG. 1, some embodiments execute various development and deployment processes. FIG. 4 illustrates an example binding process executed by a deployment component, such as the deployment system 114 describe above with reference to FIG. 1. As illustrated in FIG. 4, the deployment process 400 includes acts of receiving a binding request, binding widgets, and storing a user app. The binding process 400 begins at 402.

In act 404, a binding request is received. In at least one embodiment, the binding request is received by the deployment component. The binding request may include information identifying the source of the binding request (e.g., an app management system, such as the app management system 104 described above with reference to FIG. 1). The binding request may also include information identifying a user app requested for binding (e.g., the user app 124 described above with reference to FIG. 1).

In act 406, widgets are bound. In at least one embodiment, the widgets 128 are bound by the deployment component using information stored in the BMS data store 132. In this embodiment, the BMS data store 132 includes configuration information about devices and user preferences. This configuration information may be descriptive of devices managed by a building management system, such as the building management system 106. In some embodiments, the configuration information is retrieved from the building management system and stored in the BMS data store during execution of the act 406. In other embodiments, the configuration information is retrieved from the building management system and stored in the BMS data store prior to execution of the binding process 400.

In at least one embodiment, the deployment component binds the widgets 128 to devices monitored and controlled by the building management system 106 by replacing a default device identifier stored in the widget with a specific device identifier. For example, a default device identifier may be string value (e.g., "$AS$/RoomController/SetPoint", "$EntertainmentSystem$/Channel"). During the act of binding, the deployment component may replace $AS$ with an IP address and authentication credentials (e.g., "192.168.1.17/EWS/ . . . ", "Username, Password"). As implied from the syntax in this example, in some embodiments, a widget may be bound to a control point within device rather than the device itself. In these embodiments, there may be widgets on a page to monitor and control a single device that is monitored and controlled by the building management system. In other embodiments, the deployment component may bind the widgets to other devices or services by replacing default identifiers of the devices or services within the widgets with specific identifiers that are used by computer systems that monitor and control the other devices and services.

In act 408, a user app is stored. In at least one embodiment, the user app is stored by the deployment component in a location accessible by the source of the binding request. The deployment component may also transmit a notification to the source of the binding request indicating that the user app is accessible.

The binding process 400 ends at 410. Bound user apps can be subsequently be transmitted to particular mobile computing devices as described in acts 304 and 308 above with reference to FIG. 3. Processes in accord with the binding process 400 enable app development and binding systems to bind apps prior to transmitting apps to external devices. Bound apps may be used by the app management system (in conjunction with third party systems used to develop apps) for testing and staging purposes. Further, it is appreciated that binding processes, such as the binding process 400, enable mass customization of a fleet of mobile computing devices. This mass customization is achieved by configuring each user app on each mobile computing device with the information necessary for the user app to monitor and control all devices and service associated with an identified space (e.g., a specific hotel room).

Processes 300 and 400 each depict one particular sequence of acts in a particular embodiment. The acts included in these processes may be performed by, or using, one or more computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely an app development and deployment system configured according to the examples and embodiments disclosed herein.

User Interface Components and Additional Embodiments

According to various embodiments, an app development and deployment system, such as the app development and deployment system 100 described above with reference to FIG. 1, is configured to support devices commonly found in the hospitality industry. In one of these embodiments, a user app is configured to monitor and control devices associated with one or more hotel facilities. User roles for which the user app may adapt its pages and widgets include guests, lobby staff, facility managers, cleaning staff, kitchen staff, bellhops, and room service staff. Examples of devices and services monitored and controlled by this user app include room comfort devices (e.g., HVAC controls (e.g., thermostats), lighting controls (e.g., light switches), curtain actuators, do not disturb indicators, make-up room indicators, meal selection devices, etc.); entertainment devices and services (e.g., television, movie rental, internet access points); clock devices; and other guest services (e.g., taxi reservation, shopping, restaurant reservation, etc.).

In some embodiments, a user app is configured to monitor and control devices associated with one or more healthcare facilities. User roles for which the user app may adapt its pages and widgets include patients, visitors, nursing staff, doctors, facility managers, emergency managers, and administrators. Examples of devices and services monitored and controlled by this user app include medical devices within the healthcare facility, nurse call buttons, real-time locating system tags, HVAC controls, lighting controls, television controls, power meters and controls, security system controls, access controls, motion detectors, occupancy detectors, chillers, and boilers.

Figure 5:
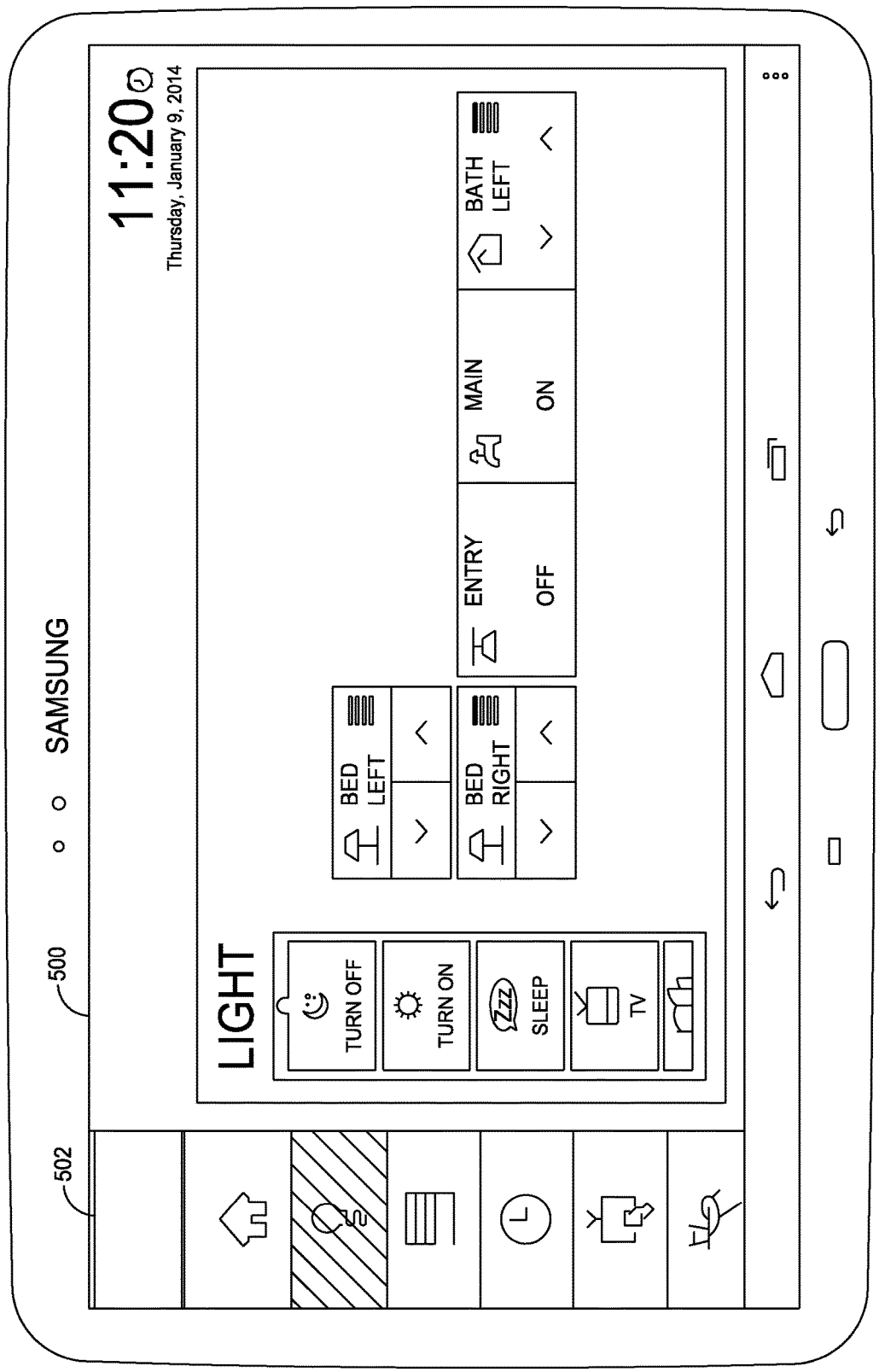
FIG. 5 is an illustration of a page of a user app.

FIGS. 5-8 illustrate one example of a user app directed to the hospitality industry. Each of the FIGS. 5-8 shows one page of the user app and each page includes several widgets. The widgets illustrated in FIGS. 5-8 are skinned according to a particular design theme for a hotel. FIG. 5 illustrates a page 500 that includes a special selection widget 502 that spans pages. The selection widget 502 controls navigation between pages included in the user app. As shown in FIG. 5, the selection widget indicates that a lighting control page is currently in focus. The page 500 also includes several lighting control widgets. Each of these widgets is bound to the lighting control devices in an identified room of the hotel and each monitors and controls the lighting control device to which it is bound via its system interface to a building management system. For example, as shown in FIG. 5, the widget bound to the main lighting control indicates that the main lighting is on. Similarly, the widget bound to the entry lighting control indicates that the entry lighting is off.

Figure 6:
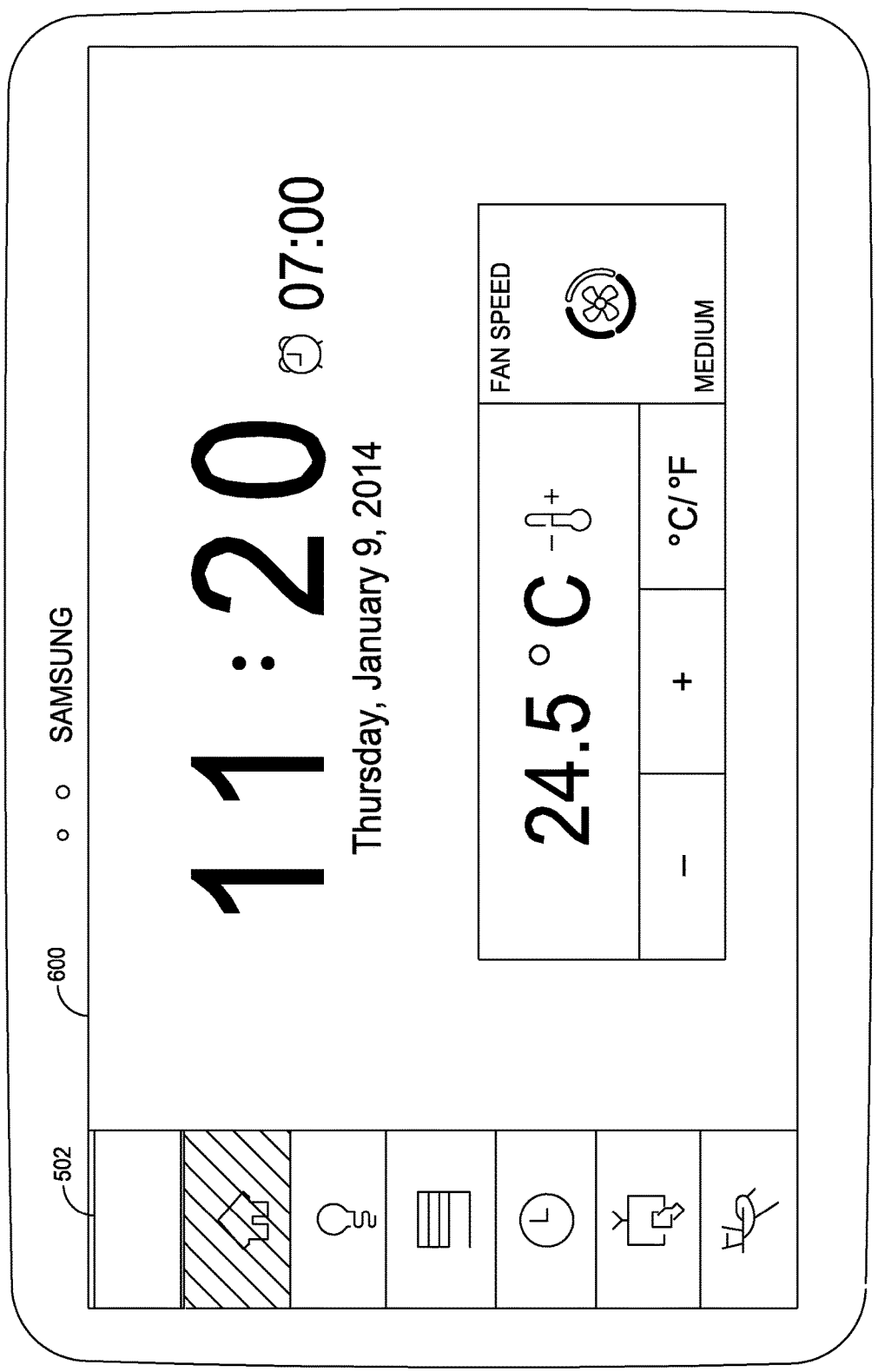
FIG. 6 is an illustration of another page of the user app.

FIG. 6 illustrates a page 600 that includes the selection widget 502. As shown in FIG. 6, the selection widget indicates that an HVAC control page is currently in focus. The page 600 also includes an HVAC control widget. The HVAC widget is bound to the HVAC control device in the identified room and monitors and controls the HVAC control device to which it is bound via its system interface to the building management system. For example, as shown in FIG. 6, the HVAC widget indicates that the set point for the temperature in the room is 24.5 degrees Celsius and the fan speed is medium.

Figure 7:
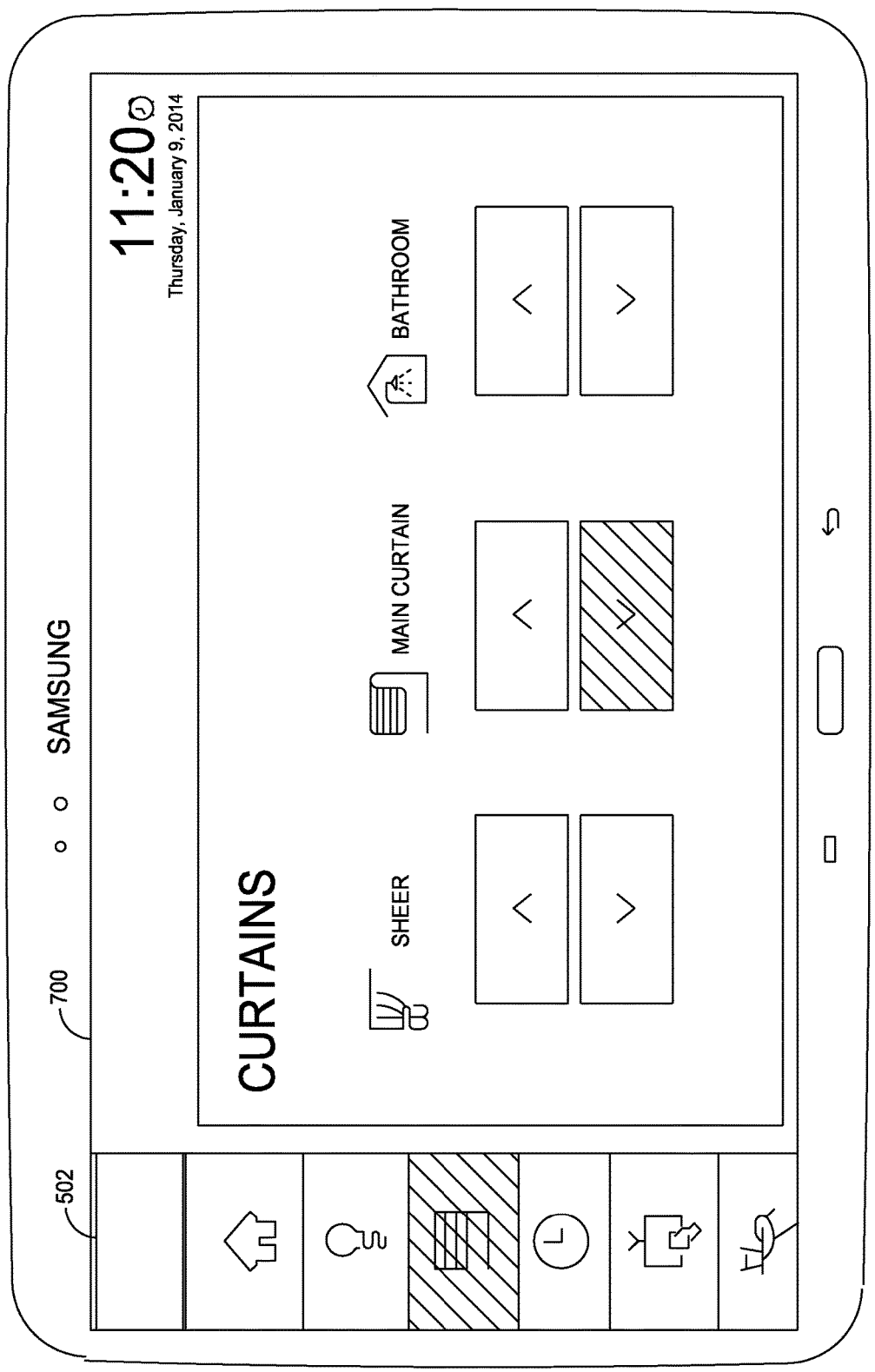
FIG. 7 is an illustration of another page of the user app.

FIG. 7 illustrates a page 700 that includes the selection widget 502. As shown in FIG. 7, the selection widget indicates that a curtain control page is currently in focus. The page 700 also includes several curtain control widgets. Each of these widgets is bound to the curtain control devices in an identified room of the hotel and each monitors and controls the curtain control device to which it is bound via its system interface to the building management system. For example, as shown in FIG. 5, the widget bound to the main curtain control indicates that the main curtain is being closed.

Figure 8:
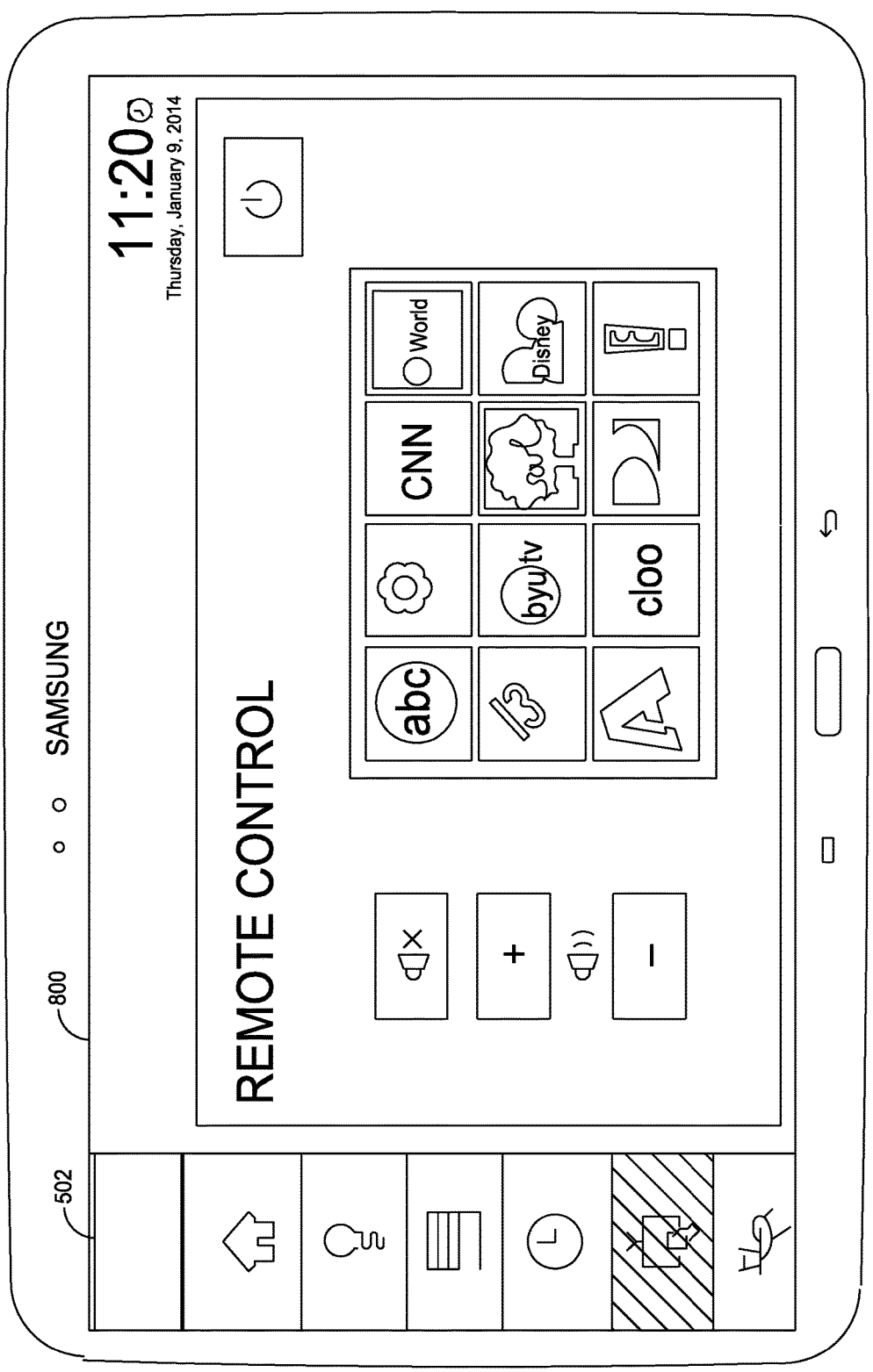
FIG. 8 is an illustration of another page of the user app.

FIG. 8 illustrates a page 800 that includes the selection widget 502. As shown in FIG. 8, the selection widget indicates that an entertainment control page is currently in focus. The page 800 also includes a television control widget. The television control widget is bound to the television control device in the identified room and monitors and controls the television control device to which it is bound via its system interface to the building management system. As shown in FIG. 8, the television control widget enables a user to select a channel and control the volume of the television.

Having thus described several aspects of at least one embodiment, it is to be appreciated that various alterations, modifications, and improvements will readily occur to those skilled in the art. Examples and embodiments disclosed herein may also be used in other contexts. For instance, while some embodiments disclosed herein focus on apps deployed to mobile computing devices, other embodiments may develop apps for and deploy apps to immobile computing devices, such as computing devices affixed to a kiosk, wall, industrial panel, or some other immobile structure. Still other embodiments develop apps for and deploy apps to any computer system. Such alterations, modifications, and improvements are intended to be part of this disclosure, and are intended to be within the scope of the examples discussed herein. Accordingly, the foregoing description and drawings are by way of example only.

What is claimed is:

1. A system comprising:
one or more memory elements collectively storing:
a plurality of widgets including a plurality of default identifiers; and
a plurality of identifiers of a plurality of devices associated with an identified space;
at least one processor in data communication with the one or more memory elements; and
a deployment component executable by the at least one processor and configured to:
receive a request to bind the plurality of widgets to the plurality of devices; and
bind, in response to receiving the request, the plurality of widgets to the plurality of devices by replacing one or more default identifiers of the plurality of default identifiers with one or more identifiers of the plurality of identifiers,
wherein the request to bind is included in a request to deploy and the deployment component is further configured to transmit, in response to receiving the request to deploy, a user app to a mobile computing device, the user app including the plurality of widgets and being configured to monitor and control the plurality of devices via the plurality of widgets.

2. The system of claim 1, wherein the deployment component is configured to transmit the user app to a shell app executing on the mobile computing device, the shell app being configured to automatically install the user app on the mobile device in response to receiving the user app.

3. The system of claim 2, further comprising a monitor and control system associated with the identified space and configured to monitor and control the plurality of devices, wherein at least one widget of the plurality of widgets includes a system interface configured to transmit at least one request to at least one device of the plurality of devices via the monitor and control system.

4. The system of claim 3, wherein the monitor and control system is a building management system.

5. The system of claim 3, wherein the deployment component is configured to bind the plurality of widgets to the plurality of devices by replacing the plurality of default identifiers with identifiers from the plurality of identifiers and the at least one request includes at least one identifier of the plurality of identifiers.

6. The system of claim 1, wherein the request to bind is included in a request to store and the deployment component is further configured to store, in response to receiving the request to store, a user app at a location accessible by an app management system.

7. The system of claim 6, wherein the app management system is configured to simulate the user app on an external computer system.

8. The system of claim 6, wherein the deployment component is further configured to:
receive a request to deploy distinct from the request to bind; and
transmit, in response to receiving the request to deploy, the user app to a mobile computing device.

9. The system of claim 1, wherein the deployment component is configured to bind the plurality of widgets to the plurality of devices at least in part by binding at least one widget of the plurality of widgets to at least one control point of at least one device of the plurality of devices.

10. A method of binding widgets to devices using a computer system having one or more memory elements collectively storing a plurality of widgets including a plurality of default identifiers and a plurality of identifiers of a plurality of devices associated with an identified space, the method comprising:
receiving, by a deployment component executed by at least one processor in data communication with the one or more memory elements, a request to bind the plurality of widgets to the plurality of devices; and
binding, by the deployment component in response to receiving the request, the plurality of widgets to the plurality of devices by replacing one or more default identifiers of the plurality of default identifiers with one or more identifiers of the plurality of identifiers,
wherein the request to bind is included in a request to deploy and the method further comprises transmitting, by the deployment component, in response to receiving the request to deploy, a user app to a mobile computing device, the user app including the plurality of widgets and being configured to monitor and control the plurality of devices via the plurality of widgets.

11. The method of claim 10, wherein transmitting the user app includes transmitting the user app to a shell app executing on the mobile computing device, and the method further comprises automatically installing, by the shell app, the user app on the mobile device in response to receiving the user app.

12. The method of claim 11, further comprising transmitting, by a system interface included in at least one widget of the plurality of widgets, at least one request to at least one device of the plurality of devices via a monitoring and control system associated with the identified space and configured to monitor and control the plurality of devices.

13. The method of claim 12, wherein transmitting the at least one request includes transmitting the at least one request via a building management system.

14. The method of claim 12, wherein binding the plurality of widgets includes replacing the plurality of default identifiers with identifiers from the plurality of identifiers and transmitting the at least one request includes transmitting at least one request including at least one identifier of the plurality of identifiers.

15. The method of claim 10, wherein the request to bind is included in a request to store and the method further comprises storing, in response to receiving the request to store, a user app at a location accessible to an app management system.

16. The method of claim 15, further comprising simulating, by the app management system, the user app on an external computer system.

17. The method of claim 15, further comprising receiving, by the deployment component, a request to deploy distinct from the request to bind; and transmitting, in response to receiving the request to deploy, the user app to a mobile computing device.

18. A non-transitory computer readable medium storing sequences of computer-executable instructions for binding widgets to devices, the sequences of computer-executable instructions including instructions that instruct at least one processor to:

execute a deployment component;

receive, by the deployment component, a request to bind a plurality of widgets to a plurality of devices associated with an identified space;

access, by the deployment component, one or more memory elements in data communication with the at least one processor and collectively storing the plurality of widgets including a plurality of default identifiers and a plurality of identifiers of the plurality of devices; and bind, in response to receiving the request, the plurality of widgets to the plurality of devices by replacing one or more default identifiers of the plurality of default identifiers with one or more identifiers of the plurality of identifiers, wherein the request to bind is included in a request to deploy and the deployment component is further configured to transmit, in response to receiving the request to deploy, a user app to a mobile computing device, the user app including the plurality of widgets and being configured to monitor and control the plurality of devices via the plurality of widgets.

* * * * *